United States Patent
Sun et al.

(10) Patent No.: US 11,353,612 B2
(45) Date of Patent: Jun. 7, 2022

(54) NONSTATIONARY MAXIMUM LIKELIHOOD METHOD TO ESTIMATE DISPERSION SPECTRA FOR FULL WAVEFORM SONIC LOGGING

(71) Applicant: Saudi Arabian Oil Company, Dhahran (SA)

(72) Inventors: Xuekai Sun, Beijing (CN); Chris B. Ayadiuno, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 664 days.

(21) Appl. No.: 16/298,540

(22) Filed: Mar. 11, 2019

(65) Prior Publication Data
US 2020/0292726 A1 Sep. 17, 2020

(51) Int. Cl.
G01V 1/36 (2006.01)
E21B 47/00 (2012.01)
G01V 1/46 (2006.01)
G01V 1/50 (2006.01)

(52) U.S. Cl.
CPC .............. *G01V 1/368* (2013.01); *E21B 47/00* (2013.01); *G01V 1/46* (2013.01); *G01V 1/50* (2013.01); *G01V 2210/1234* (2013.01)

(58) Field of Classification Search
CPC . G01V 1/368; G01V 1/46; G01V 1/50; G01V 2210/1234; E21B 47/00
See application file for complete search history.

(56) References Cited

U.S. PATENT DOCUMENTS

| | | | |
|---|---|---|---|
| 4,648,039 A | 3/1987 | Devaney et al. | |
| 4,703,460 A | 10/1987 | Kurkjian et al. | |
| 5,191,526 A | 3/1993 | Laster et al. | |
| 5,771,203 A * | 6/1998 | Soubaras | G01V 1/364 702/77 |
| 5,970,023 A | 10/1999 | Chambers et al. | |
| 6,449,560 B1 | 9/2002 | Kimball | |

(Continued)

FOREIGN PATENT DOCUMENTS

| CN | 1656389 | 8/2005 |
|---|---|---|
| CN | 103069303 | 4/2013 |

(Continued)

OTHER PUBLICATIONS

"The Relationship Between Maximum Entropy Spectra and Maximum Likelihood Spectra", Geophysics, vol. 37, No. 2 (Apr. 1972), p. 375-376 (Year: 1972).*

(Continued)

*Primary Examiner* — Krystine E Breier
(74) *Attorney, Agent, or Firm* — Fish & Richardson P.C.

(57) ABSTRACT

The present disclosure describes methods and systems for estimating dispersion spectra for full waveform sonic (FWS) logging. One computer-implemented method includes receiving FWS data, performing frequency-spatial (FX) transform on the FWS data, using a nonstationary predictive error filtering (PEF) inversion on the transformed FWS data to estimate local matrix L and matrix P, calculating an inverse covariance matrix based on the estimated local matrix L and matrix P, and obtaining a nonstationary maximum likelihood method (MLM) spectra based on the inverse covariance matrix.

15 Claims, 6 Drawing Sheets

(56) References Cited

U.S. PATENT DOCUMENTS

| | | | |
|---|---|---|---|
| 6,614,716 | B2 | 9/2003 | Plona et al. |
| 6,625,541 | B1 | 9/2003 | Shenoy et al. |
| 7,203,600 | B2 | 4/2007 | Keers et al. |
| 7,492,664 | B2 | 2/2009 | Tang et al. |
| 8,395,966 | B2 | 3/2013 | Moore et al. |
| 8,521,433 | B2 | 8/2013 | Hirabayashi et al. |
| 8,811,114 | B2 | 8/2014 | Geerits et al. |
| 8,880,348 | B2 | 11/2014 | Bolshakov et al. |
| 9,453,925 | B2 | 9/2016 | Beasley et al. |
| 2002/0138202 | A1 | 9/2002 | Ruben |
| 2003/0076741 | A1 | 4/2003 | Robertsson et al. |
| 2003/0220744 | A1 | 11/2003 | Schonewille |
| 2004/0223412 | A1 | 11/2004 | Haldorsen |
| 2005/0174885 | A1 | 8/2005 | Robinson |
| 2008/0319675 | A1 | 12/2008 | Sayers |
| 2009/0067286 | A1 | 3/2009 | Bose et al. |
| 2012/0004849 | A1 | 1/2012 | Aarre |
| 2015/0331134 | A1 | 11/2015 | Haldorsen et al. |
| 2018/0196156 | A1* | 7/2018 | Assous .................... G01V 1/46 |
| 2018/0329097 | A1 | 11/2018 | Sun et al. |

FOREIGN PATENT DOCUMENTS

| | | | |
|---|---|---|---|
| CN | 103149592 | | 6/2013 |
| CN | 104570095 | | 4/2015 |
| CN | 104932010 | | 9/2015 |
| EP | 0730744 | B1 * 12/1999 | ............. G01V 1/364 |
| EP | 2594962 | | 5/2013 |
| GB | 2536179 | | 9/2016 |
| JP | H1177871 | | 3/1999 |
| JP | 2006122084 | | 5/2006 |
| WO | WO 02059649 | | 8/2002 |
| WO | WO 2008112462 | | 9/2008 |
| WO | WO 2009035848 | | 3/2009 |
| WO | 2016057384 | | 4/2016 |

OTHER PUBLICATIONS

Hsu et al, "Application of the maximum-likelihood method (MLM) for sonic velocity logging", Geophysics, vol. 51, No. 3 (Mar. 1986); p. 780-787. (Year: 1986).*
GCC Examination Report in GCC Appln. No. GC 2018-35276, dated Apr. 6, 2020, 4 pages.
EPO Communication Pursuant to Article 94(3) in International Appln. No. 18726300.9-1001, dated Jun. 25, 2020, 6 pages.
CA Office action in Canadian Appln. No. 3063129, dated Mar. 16, 2021, 18 pages.
JP Office action in Japanese Appln. No. JP 2019-562287, dated Feb. 2, 2021, 9 pages, with English Translation.
Maeland, "Sampling, aliasing, and inverting the linear Radon transform," Geophysics, May-Jun. 2004, 69(3):859-861.
Trad et al., "Latest views of the sparse Radon transform," Geophysics, Jan.-Feb. 2013, 68(1):386-399.
Yu et al., "Wavelet-Radon Domain De-Aliasing and Interpolation of Seismic Data," SEG International Exposition and 74th Annual Meeting, Denver, Colorado, Oct. 10-15, 2004, 4 pages.
CN Office action in Chinese Appln. No. 201880044536.X, dated Feb. 1, 2021, 11 pages, with English Translation.
International Search Report and Written Opinion issued in International Application No. PCT/US2018/031399 dated Aug. 8, 2018, 15 pages.
Burg, "Maximum Entropy Spectral Analysis: Appendix B," a dissertation submitted to the Department of Geophysics and the Committee on Graduate Studies of Standford University in Partial Fulfillment of the Requirements of the Degree of Doctor of Philsophy, May 1975, 4 pages.

Burg, "The Relationship between maximum entropy spectra and maximum likelihood spectra," Geophysics vol. 37, No. 2, Apr. 1972, 2 pages.
Capon et al., "Multidimensional maximum-likelihood processing of a large aperture seismic array. Proc.," Inst. Elect. Electron. Eng. vol. 55, Feb. 1967, 20 pages.
Capon, "High-resolution frequency-wavenumber spectrum analysis. Proc.," Inst. Elect. Electron. Engin. vol. 57, No. 8, Aug. 1969, 11 pages.
Duckworth and Baggeroer, "Inversion of refraction data from the fram and nansen basins of the arctic ocean," AD-A196 424 Tectonophysics vol. 114, Apr. 20, 1985, 48 pages.
Fomel, "Shaping regularization in geophysical-estimation problems," Geophysics 72(2) R29-R36, Mar.-Apr. 2007, 8 pages.
Greenhalgh et al., "Controlled Direction Reception Filtering of P- and S-waves in τ-p Space," Geophysical Journal International, vol. 100, Published in 1990, pp. 221-234.
Hampson, "Inverse Velocity Stacking for Multiple Elimination," Journal of Canadian Society Exploration Geophysics 22, Dec. 1986, pp. 44-55.
Hornby et al., "Analysis of Full-waveform Sonic Data Acquired in Unconsolidated Gas Sands," XPO-55496081, Annual Logging Symposium, Sep. 1, 2000, 14 pages.
Hsu and Baggeroer, "Application of the maximum-likelihood method (MLM) for sonic velocity logging," Geophysics, 51(3), Mar. 1986, 8 pages.
Jovanovic et al., "P and S Waves Separation from Vector VSP's by a Blocky Antialias Discrete Radon Transform," Application to Vinton Dome, LA, Oct. 10-15, SEG International Exposition and 74rh Annual Meeting, 4 pages.
Liu et al., "Random noise attenuation using f-x regularized nonstationary autoregression," Geophysics vol. 72, Issue 2, V61-V69, Mar.-Apr. 2012, 9 pages.
Mari et al., "Automatic processing of full-waveform sonic data," XP055496091, SEG Technical Program Expanded Abstracts 1991, Jan. 1, 1991, 4 pages.
Moon et al., "Radon Transform Wave Field Separation for Vertical Seismic Profiling Data," Geophysics 51, Apr. 1986, pp. 940-947.
Murray et al., "Formation Compressional and Shear interval-Transit Time Logging by Means of Long Spacings and Digital Techniques," SPE 7446, Published in 1978, 11 pages.
Pendrel and Smylie, "The relationship between maximum entropy and maximum likelihood spectra," Geophysics vol. 44, No. 10, Oct. 1979, 2 pages.
Sacchi et al., "High-Resolution Velocity Gathers and Offset Space Reconstruction," Geophysics, vol. 60, Jul.-Aug. 1995, pp. 1169-1177.
Wang, "Antialiasing Conditions in the Delay-Time Radon Transform," Geophysical Prospecting 50, Published in 2002, pp. 665-672.
Wang, "Multiple Attenuation: Coping with the Spatial Truncation Effect in the Radon Transform Domain," Geophysical Prospecting 51, Published in 2003, pp. 75-87.
GCC Examination Report in GCC Appln. No. GC 2018-35276, dated May 4, 2021, 3 pages.
GCC Examination Report in Gulf Cooperation Council Appln. No. GC 2020-39339, dated Jul. 18, 2021, 3 pages.
International Search Report and Written Opinion issued in International Application No. PCT/US2020/021654 dated Jun. 24, 2020, 16 pages.
Kurkjian et al., "Slowness Estimation from Sonic Logging Waveforms," Geoexploration, Elsevier, vol. 27, No. 3/04, Mar. 1, 1991, 42 pages.

* cited by examiner

NONSTATIONARY MAXIMUM LIKELIHOOD METHOD TO ESTIMATE DISPERSION SPECTRA FOR FULL WAVEFORM SONIC LOGGING

TECHNICAL FIELD

This disclosure relates to estimating dispersion spectra for full waveform sonic (FWS) logging and, more specifically, by using a nonstationary maximum likelihood method (MLM).

BACKGROUND

In FWS logging, dispersion analysis has been used for inferring lithology, fracture, and fluid types. Efficient and accurate dispersion spectra estimation is important for the FWS dispersion analysis.

SUMMARY

The present disclosure describes methods and systems, including computer-implemented methods, computer program products, and computer systems for estimating dispersion spectra for full waveform sonic (FWS) logging. One computer-implemented method includes receiving FWS data, performing frequency-spatial (FX) transform on the FWS data, using a nonstationary predictive error filtering (PEF) inversion on the transformed FWS data to estimate local matrix L and matrix P, calculating an inverse covariance matrix based on the estimated local matrix L and matrix P, and obtaining a nonstationary maximum likelihood method (MLM) spectra based on the inverse covariance matrix.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each, optionally, include one or more of the following features, alone or in combination:

A first aspect, combinable with the general implementation, the method further comprising obtaining a nonstationary maximum entropy method (MEM) spectra based on the estimated local matrix L and matrix P.

A second aspect, combinable with any of the previous aspects, where the FWS data are sonic waveforms recorded by a receiver array, and the sonic waveforms are excited by a transmitter and propagate along a borehole on a hydrocarbon reservoir.

A third aspect, combinable with any of the previous aspects, the method further comprising estimating petrophysical properties of a borehole region based on the nonstationary MLM spectra.

A fourth aspect, combinable with any of the previous aspects, where the inverse covariance matrix is calculated using Burg's equation.

A fifth aspect, combinable with any of the previous aspects, where the nonstationary PEF inversion is performed in FX domain.

A sixth aspect, combinable with any of the previous aspects, where the FX transform is one dimensional (1D) Fourier transform, and the nonstationary MLM spectra is obtained independent of linear moveout (LMO) correction.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the following description. Other features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

The following detailed description describes using a nonstationary maximum likelihood method (MLM) to estimate dispersion spectra for full waveform sonic (FWS) logging, and is presented to enable a person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

In FWS logging, dispersion analysis has been used for inferring lithology, fracture, and fluid types. MLM can be used to estimate FWS dispersion spectra. However, MLM depends on, for example, partial linear moveout (LMO) correction or pseudo-ensemble averaging and pre-whitening to estimate the MLM kernel (that is, inverse local covariance matrix). As a result, estimating FWS dispersion spectra using MLM can lead to over-estimation and inaccurate representations of FWS dispersion spectra.

At a high level, the described approach provides a non-stationary MLM to estimate dispersion spectra for FWS logging. The described nonstationary MLM utilizes a non-stationary predictive error filtering (PEF) inversion within the framework of the Burg algorithm to estimate local matrix L and local matrix P, and use the local matrix L and local matrix P to obtain the local inverse covariance. By using the nonstationary MLM, partial LMO correction is not required in estimating FWS dispersion spectra. In other words, the nonstationary MLM is independent of partial LMO correction and pseudo-ensemble averaging. As a result, computational costs for estimating FWS dispersion spectra can be reduced by using the nonstationary MLM. In addition, the described nonstationary MLM can serve as a standard workflow for dispersion estimation and analysis, provide efficient and accurate dispersion spectra estimation, and have a higher resolution in characterizing velocity dispersion than other stationary MLMs.

FWS logging data, due to its intermediate frequency band between seismic data and ultrasonic data, is important information for studying dispersion phenomena. Among the dispersion characterization methods, MLM is a data adaptive processing method and can be applied to reflection seismic, vertical seismic profile, and FWS processing.

Generally, in a FWS configuration, a receiver array can record sonic waveforms that are excited by a transmitter and propagate along a borehole. The recorded signals can be shown by tilted waveforms along offset direction. For example, in the FWS configuration, there are M receivers in the receiver array with offset ranging from $z_1$ to $z_M$, and the recorded sonic waveform at $i^{th}$ receiver is $x_i$ ($1 \leq i \leq M$). A classic MLM form for spectra estimation can be expressed as:

$$\sigma^2(w, t_c, \hat{s}) = [e^+(w, \hat{s}) R^{-1}(w, t_c, s) e(w, \hat{s})]^{-1} \quad (1)$$

where $e(w, \hat{s}) = [e^{jw\hat{s}z_1} e^{jw\hat{s}z_2} \ldots e^{jw\hat{s}z_M}]^T$, w and $t_c$ are angular frequency and recoding time, respectively, and $\hat{s}$ stands for the scanning slowness centered around a reference slowness s, which is employed to partially correct the titled waveforms (usually in frequency domain) in order to let more data information flow into the window for MLM analysis. $e^+(w, \hat{s})$ is the conjugate transpose of $e(w, \hat{s})$. The kernel of Equation (1) involves estimation of $R^{-1}$, which is the inverse of covariance matrix R. R can be expressed as:

$$R(w, t_c, s) = x(w, t_c, s) x^+(w, t_c, s) \quad (2)$$

where $x^+(w, t_c, s)$ is the conjugate transpose of $x(w, t_c, s)$, and $x(w, t_c, s)$ stands for the LMO-corrected short time Fourier transform (STFT) on recorded signals of each channel with a time window size $t_w$, that is:

$$x_i(w, t_c, s) = e^{-jw s z_i} \int_{t_c}^{t_c + t_w} w(t - t_c) x_i(t + s z_i) e^{-jwt} dt \quad (3)$$

As shown in Equations (1) to (3), estimation accuracy of R (or $R^{-1}$) is important to the spectra estimation. In some implementations, averaging the covariance matrix R over a neighboring frequency band of the interested frequency (also known as pseudo-ensemble averaging) can be used to improve estimation accuracy of R. In addition, normalization and pre-whitening can be used to ensure numerical stability during the inverse conversion from R to $R^{-1}$.

Equation (1) represents a three dimensional (3D) MLM form in terms of frequency, time, and slowness. To use the 3D MLM form for spectra estimation, the following workflow can be performed. For example, a reference slowness and its corresponding scanning slowness range are determined for each frequency. For a particular frequency, LMO-corrected STFT (that is, Equation (3)) is performed followed by estimation of R (that is, Equation (2)). After R to $R^{-1}$ conversion, spectra of the particular frequency (that is, $\sigma^2(t_c, \hat{s})$) can be calculated using Equation (1). In many cases, the actual scanning slowness is large, and can't to be handled with one reference slowness efficiently. In those cases, multiple reference slowness can be used, and the same procedure can be repeated for each sub-scanning range. The 3D spectra (that is, $\sigma^2(w, t_c, \hat{s})$) can be obtained by repeating the previously-described workflow for all interested frequencies. Since an important task of dispersion analysis is to evaluate relationship of slowness (or velocity) and frequency (that is, $\sigma^2(w, \hat{s})$), energy clusters are picked on each $\sigma^2(t_c, \hat{s})$ map manually to quantify the relationship.

Due to extra consideration on the time dimension and repeated partial LMO correction for each reference slowness, calculation cost of the 3D MLM (that is, Equation (1)) can be expensive. Therefore, the 3D MLM for spectra estimation is unaffordable to be used in practical applications. In some implementations, Burg algorithm can be used as an effective method to mitigate the calculation cost, and to efficiently generate a two dimensional (2D) MLM spectra (that is, $\sigma^2(w, \hat{s})$).

Based on the Burg algorithm, estimating MLM spectra can be performed in frequency-spatial (FX) domain (discussed in more detail with Equation (4) below). For example, predictive error filters (PEFs) of all available orders can be constructed by recursively calculating reflection coefficients under the principle of maximizing forward/backward prediction error energy. As a result, a lower triangular matrix L containing PEF coefficients and a diagonal matrix P containing predictive errors can then be derived and combined, using Burg's Equation (that is, Equation (9) below), to estimate $R^{-1}$ and the MLM spectra.

Using the Burg algorithm for MLM spectra estimation, the time dimension is not considered, and repeated partial LMO correction is not performed. As a result, the Burg algorithm for MLM spectra estimation has a significantly lower calculation cost than the 3D MLM form for spectra estimation, thereby affordable to be used in practical applications. However, Burg algorithm approaches MLM from a stationary perspective by iteratively solving matrix L and matrix P (discussed in more detail with Equations (7) to (9) below) for each frequency, which overlooks the intrinsic nonstationarity in frequency dimension. In addition, spectrum for each frequency is estimated separately when using the previously-described Burg algorithm for MLM spectra estimation. As a result, the previously-described Burg algorithm is incapable of capturing dispersion features. In addition, when using the previously-described Burg algorithm for MLM spectra estimation, pseudo-ensemble averaging and pre-whitening are performed in order to enhance numerical robustness of the estimation process. Performing pseudo-ensemble averaging and pre-whitening can average (or smear) the final estimated dispersion spectra, and result in inaccurate dispersion spectra estimation.

For efficient and accurate dispersion characterization of FWS data, a new workflow for dispersion estimation and analysis (referred as the nonstationary MLM) is described in the present disclosure. In the nonstationary MLM, a nonstationary auto-regression in an inversion form is utilized to estimate local predictive coefficients and predictive errors. The nonstationary MLM has similar efficiency as the previously-described Burg algorithm for MLM spectra estimation. In addition, the nonstationary MLM is more competent in capturing and preserving nonstationary dispersion features contained in the FWS data than the previously-described Burg algorithm for MLM spectra estimation.

To use the nonstationary MLM for spectra estimation, the following workflow can be performed. For example, FWS data can be preprocessed first before being used for dispersion estimation and analysis. In some implementations, the FWS data does not need to be preprocessed before being used for dispersion estimation and analysis. In other words, the preprocessing is an optional step in the nonstationary MLM for spectra estimation. The preprocessing can include determination of the effective frequency and slowness range. The preprocessing can also include signal-to-noise ratio enhancement using a frequency filtering procedure, or other suitable de-noising procedure. In some cases, the preprocessing can include separating a target wave component from the total wavefield to reduce the mixing effects of other wave components. In some implementations, the optional preprocessing is implemented to better prepare the FWS data for the dispersion estimation and analysis.

Next, frequency-spatial (FX) transform (also known as frequency-offset transform), instead of STFT, is applied to the preprocessed FWS data (or the FWS data if the optional preprocessing is not implemented). For example, the FX transform can be performed by conducting one dimensional (1D) Fourier transform on the recorded signal of each channel (or trace). The 1D Fourier transform can be expressed as:

$$x_i(w, z_i) = \int x_i(t, z_i) e^{-jwt} dt \quad (4)$$

As shown in Equations (3) to (4), the FX transform (that is, Equation (4)) does not have partial LMO correction that is included in Equation (3). Therefore, calculation cost of Equation (4) is lower than calculation cost of Equation (3).

After FX transform, nonstationary auto-regression can be performed in the FX domain. In some implementations, the nonstationary auto-regression is performed using nonstationary predictive error filters (PEFs). To obtain solutions that can preserve dispersion features in the FWS signals, a nonstationary PEF can be formulated by considering PEF coefficients' dependence on frequency (along the frequency dimension instead of the offset dimension), that is:

$$\varepsilon(w) = x_{w,m} - \Sigma_{k=1}^{i} a_{w,k} x_{w,m-k} \quad (5)$$

where $\varepsilon(w)$ is PEF error for frequency w, $a_{w,k}$ is frequency-dependent PEF coefficient, m is an offset index (for example, indicating the $m^{th}$ receiver), and i is the PEF order to be analyzed. In some implementations, the shaping regularization can be used to reduce the non-uniqueness of the nonstationary PEF inversion. For example, a regularized objective function for Equation (5) can be expressed as:

$$J = \min(\|x_{w,m} - \Sigma_{k=1}^{i} a_{w,k} x_{w,m-k}\|_2^2 + R[a_{w,k}]) \quad (6)$$

Solving the nonstationary PEF inversion for all available orders (that is, 0~M−1), the obtained PEF coefficients and their corresponding predictive errors at frequency w can be used to form a lower triangular matrix $L_w$ and a diagonal matrix $P_w$, that is:

$$L_w = \begin{bmatrix} 1 & 0 & \cdots & 0 \\ a_w(2, M-1) & 1 & \cdots & 0 \\ a_w(3, M-1) & a_w(2, M-2) & \vdots & \vdots \\ \vdots & \vdots & \vdots & \vdots \\ a_w(M-1, M-1) & a_w(M-2, M-2) & \cdots & 1 \end{bmatrix} \quad (7)$$

$$P_w = \begin{bmatrix} p_w(M) & 0 & \cdots & 0 \\ 0 & p_w(M-1) & \cdots & 0 \\ 0 & 0 & \vdots & \vdots \\ \vdots & \vdots & \vdots & \vdots \\ 0 & 0 & \cdots & p_w(1) \end{bmatrix} \quad (8)$$

In Equation (7), the rightmost column to the leftmost column correspond to PEF coefficients of the 0-order to the $(M-1)^{th}$ order. In Equation (8), $p_w(i)$ is the $i^{th}$ order predictive error for frequency w. Local L and P are estimated through nonstationary PEF inversion. In doing so, frequency relationships of PEFs can be properly handled by using shaping regularization. As a result, the nonstationary features contained in FWS signals can be properly persevered and represented.

Based on Burg's Equation, an inverse covariance matrix $R^{-1}$ for each frequency w can be expressed as:

$$R^{-1} = LP^{-1}L^+ \quad (9)$$

Using the nonstationary MLM, estimated dispersion spectra (that is, a nonstationary MLM spectra) can be obtained by substituting the inverse covariance matrix $R^{-1}$ obtained from Equation (9), instead of from Equation (2), into Equation (1). In addition, a nonstationary maximum entropy method (MEM) spectra can be obtained based on $L_w$ and $P_w$ obtained from Equations (7) and (8), respectively. For example, the MEM spectra for the $i^{th}$ order can be expressed as:

$$MEM(w, \hat{s}) = \frac{p_w(i) \cdot \Delta x}{\left| \sum_{k=1}^{i} a_w(k, i) \cdot \exp(iw \cdot (k-1) \cdot \Delta x \cdot \hat{s}) \right|} \quad (10)$$

where $\Delta x$ is an offset spacing interval.

Figure 1:
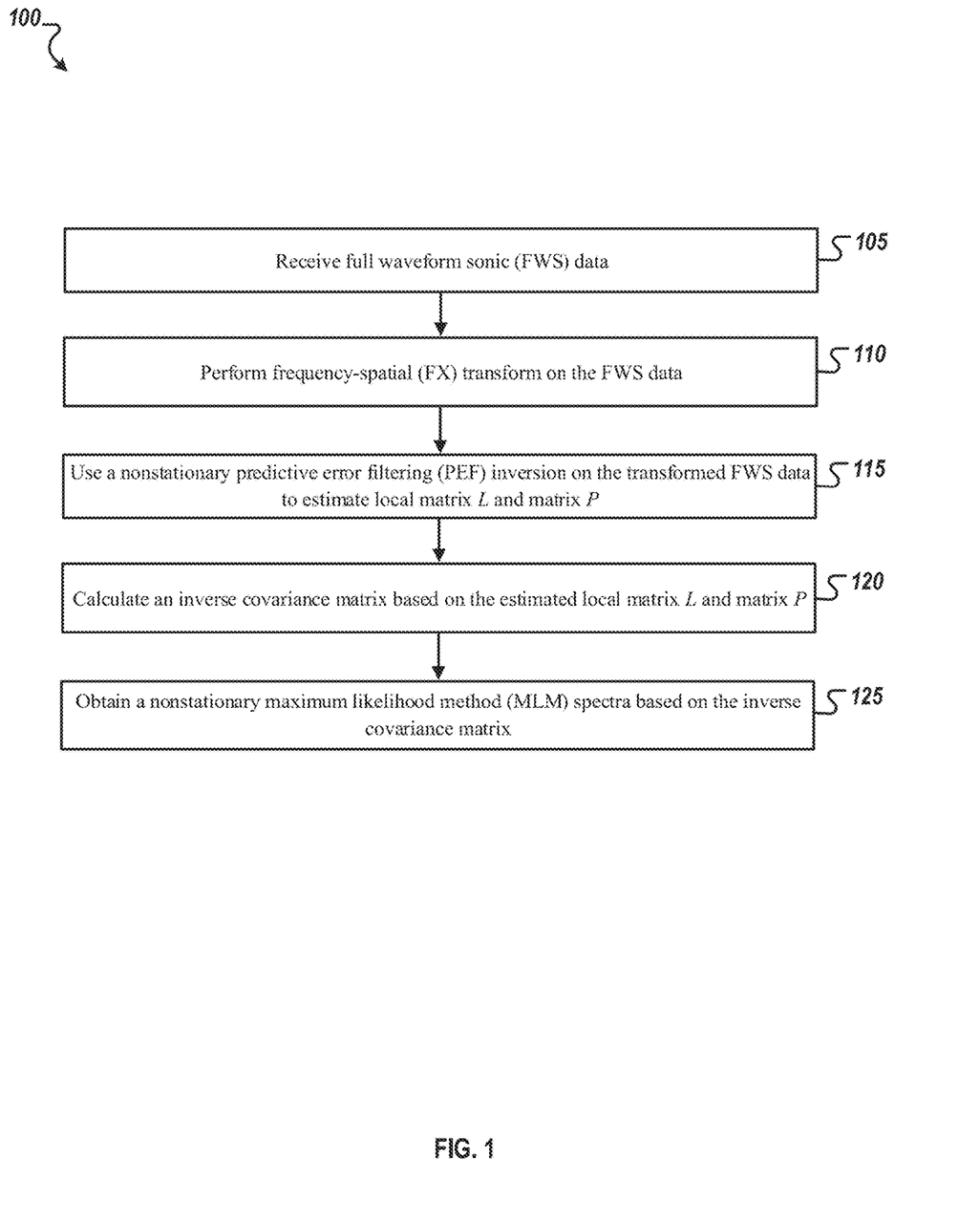
FIG. 1 illustrates an example method for estimating dispersion spectra for full waveform sonic (FWS) logging using a nonstationary maximum likelihood method (MLM), according to some implementations.

FIG. 1 illustrates an example method 100 for estimating dispersion spectra for full waveform sonic (FWS) logging using a nonstationary maximum likelihood method (MLM), according to some implementations. For clarity of presentation, the description that follows generally describes method 100 in the context of the other figures in this description. For example, method 100 can be performed by a computer system described in FIG. 5. However, it will be understood that method 100 may be performed, for example, by any suitable system, environment, software, and hardware, or a combination of systems, environments, software, and hardware, as appropriate. In some implementations, various steps of method 100 can be run in parallel, in combination, in loops, or in any order.

The method 100 starts at block 105 where full waveform sonic (FWS) data is received. In some implementations, the FWS data are sonic waveforms recorded by a receiver array. The receiver array can record sonic waveforms that are excited by a transmitter and propagate along a borehole on a hydrocarbon reservoir. The recorded signals can be shown by tilted waveforms along offset direction. For example, the receiver array includes M receivers with offset ranging from $z_1$ to $z_M$. The recorded sonic waveform at $i^{th}$ receiver in the receiver array is $x_i (1 \leq i \leq M)$.

At block 110, frequency-spatial (FX) transform is performed on the FWS data. The FX transform can be one dimensional (1D) Fourier transform (for example, Equation (4)). In some implementations, the FWS data can be preprocessed before the FX transform is performed on the FWS data. For example, an effective frequency and slowness range can be determined based on the FWS data. Signal-to-noise ratio can be enhanced for the FWS data using a frequency filtering procedure (or other suitable de-noising procedure). In some cases, a target wave component can be separated from the total wavefield to reduce the mixing effects of other wave components. In doing so, the FWS data can be better prepared for the dispersion estimation and analysis.

At block 115, a nonstationary predictive error filtering (PEF) inversion, instead of Burg algorithm, is used on the transformed FWS data to estimate local matrix L and matrix P. In some implementations, a nonstationary auto-regression is performed in the FX domain. For example, PEF coefficients and the corresponding PEF predictive errors at frequency w can be obtained by solving the nonstationary PEF inversion for all available orders (that is, 0~M−1). The local matrix L and matrix P (for example, a lower triangular matrix $L_w$ and a diagonal matrix $P_w$) can be formed using the PEF coefficients and the corresponding PEF predictive errors at frequency w (for example, Equations (7) and (8)).

At block 120, an inverse covariance matrix is calculated based on the estimated local matrix L and matrix P. In some implementations, the inverse covariance matrix is calculated using Burg's equation (for example, Equation (9)). For example, an inverse covariance matrix for frequency w can be calculated using Burg's equation (that is, $R_w^{-1} = L_w P_w^{-1} L_w^{+}$).

At block 125, a nonstationary maximum likelihood method (MLM) spectra is obtained based on the inverse covariance matrix. For example, an inverse covariance matrix obtained from Equation (9), instead of Equation (2), can be used in Equation (1) to estimate the nonstationary MLM spectra (that is, FWS dispersion spectra). In some implementations, the nonstationary MLM spectra is obtained independent of linear moveout (LMO) correction. The dispersion spectra can be free of processing artifacts, and suitable for inferring petrophysical properties near a borehole region. In some implementations, in addition to the nonstationary MLM spectra, a nonstationary maximum entropy method (MEM) spectra can be obtained based on the estimated local matrix L and matrix P (for example, Equation (10)).

The example method 100 shown in FIG. 1 can be modified or reconfigured to include additional, fewer, or different steps (not shown in FIG. 1), which can be performed in the order shown or in a different order. For example, after block 125, reservoir characterization (such as, petrophysical properties of a borehole region) can be estimated based on the nonstationary MLM spectra. In some implementations, the nonstationary MLM, the nonstationary MEM, or a combination of both can be applied to a real dipole data (discussed in FIG. 5 below) to provide dispersion characterization in dispersion analysis. In some implementations, one or more of the steps shown in FIG. 1 can be repeated or iterated, for example, until a terminating condition is reached. In some implementations, one or more of the individual steps shown in FIG. 1 can be executed as multiple separate steps, or one or more subsets of the steps shown in FIG. 1 can be combined and executed as a single step. In some implementations, one or more of the individual steps shown in FIG. 1 may also be omitted from the example method 100.

Figure 2:
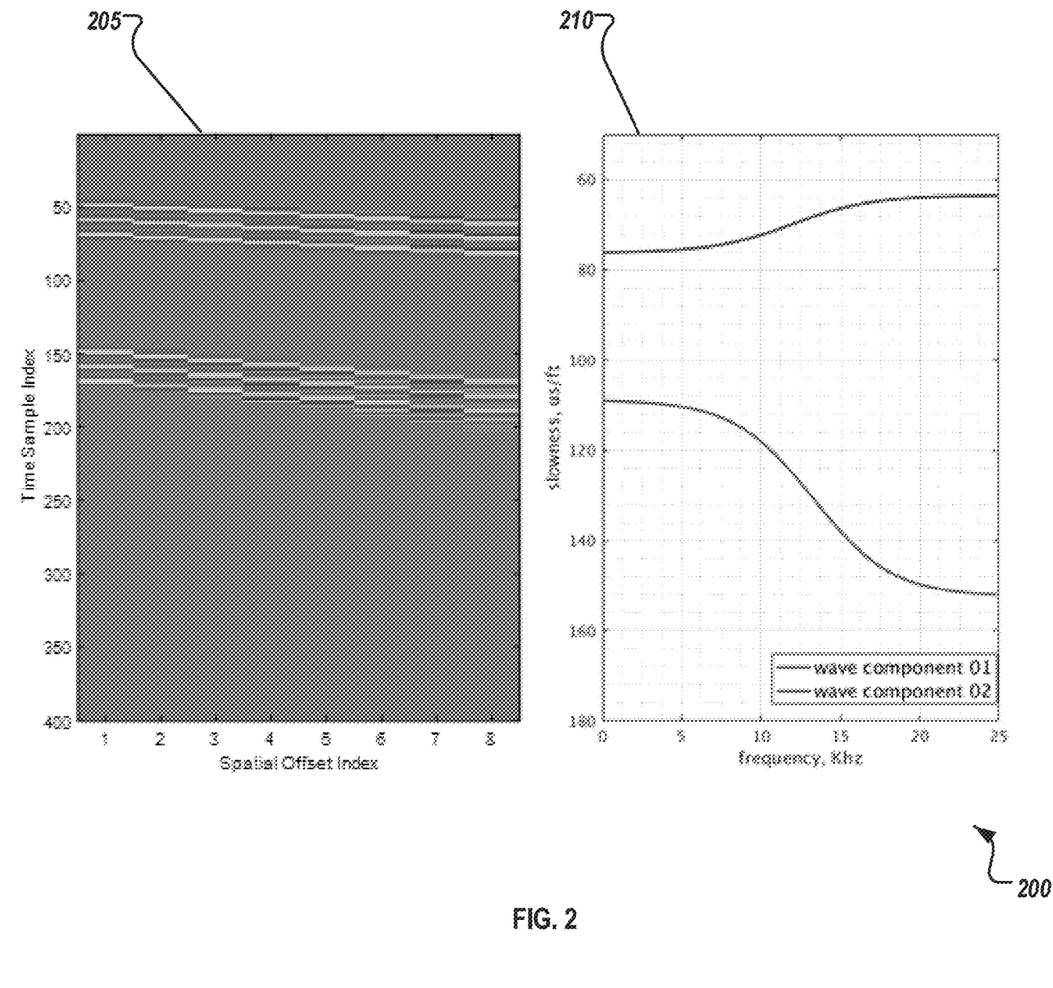
FIG. 2 illustrates example images of synthetic FWS data and corresponding dispersion curves, according to some implementations.

FIG. 2 illustrates example images 200 of synthetic FWS data and corresponding dispersion curves, according to some implementations. To investigate efficiency and accuracy of the nonstationary MLM, synthetic FWS data is used. For example, the synthetic data is simulated on 8 channels with an equal spacing of 0.5 feet. The first channel is 10.75 feet away from a transmitter. Each trace in image 205 contains 400 samples along the time direction with a time interval of 20 microseconds. In FIG. 2, two wave components with opposite dispersive characters are simulated in synthetic FWS data. The corresponding dispersion curves (that is, theoretical dispersion curves for the two wave components) are shown in image 210.

Figure 3:
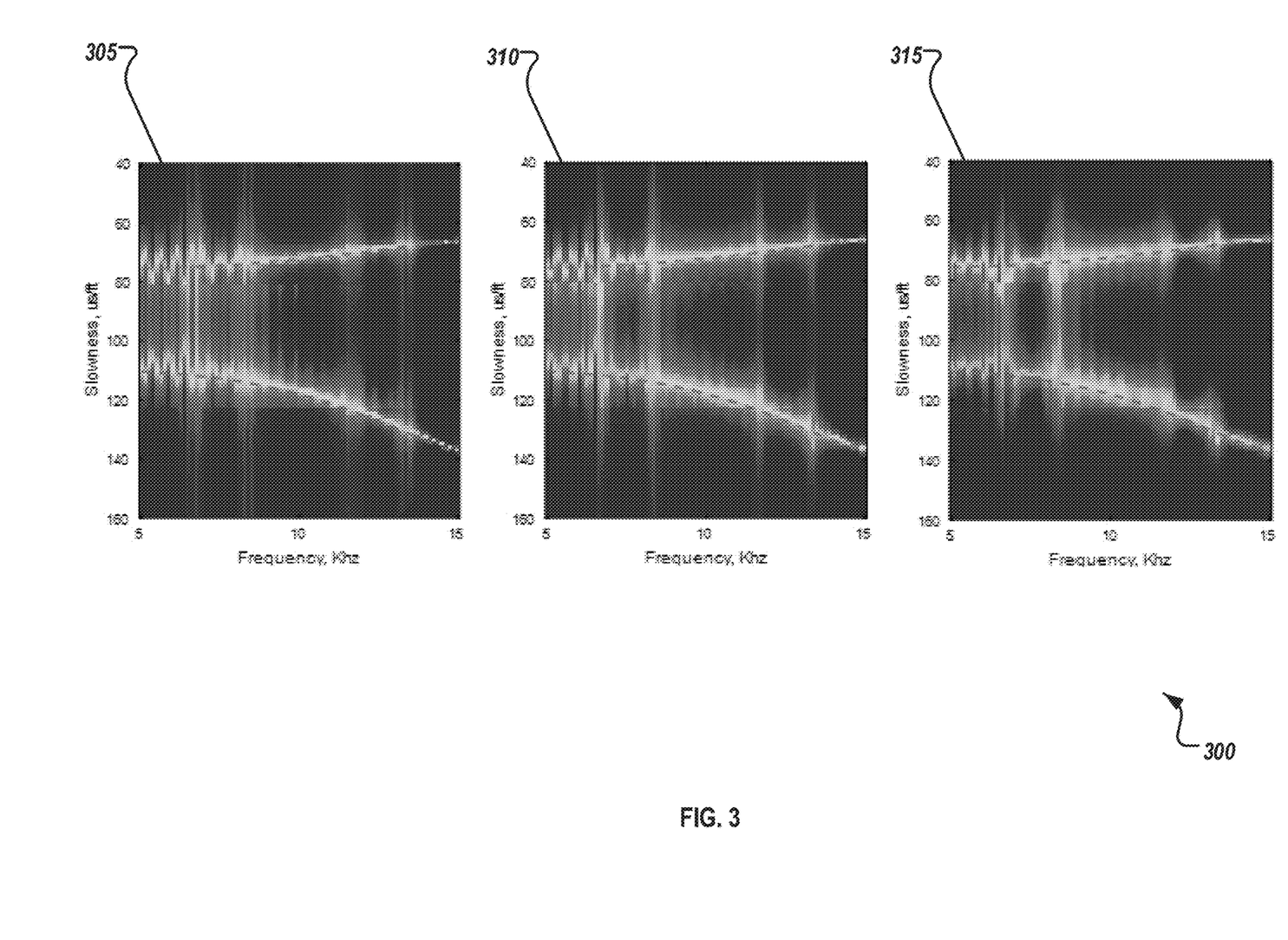
FIG. 3 illustrates example images of estimated dispersion spectra using a conventional MLM, according to some implementations.

FIG. 3 illustrates example images 300 of estimated dispersion spectra using a conventional MLM, according to some implementations. For example, the previously-described Burg algorithm for MLM spectra estimation is applied to the synthetic FWS data in FIG. 2. To improve the covariance matrix estimation, pseudo-ensemble averaging with different frequency averaging radius are performed. In FIG. 3, curves represented by dashed lines are the actual dispersion. Image 305 shows estimated dispersion spectra with 1-point-length radius (125 Hz). Image 310 shows estimated dispersion spectra with 2-point-length radius (250 Hz). Image 315 shows estimated dispersion spectra with 4-point-length radius (500 Hz). As shown in FIG. 3, pseudo-ensemble averaging is not a good way to capture and preserve nonstationary signal features, and thereby the conventional MLM is unable to generate high-resolution dispersion spectra. In addition, as frequency radius increases, resolution of obtained dispersion spectra decreases.

Figure 4:
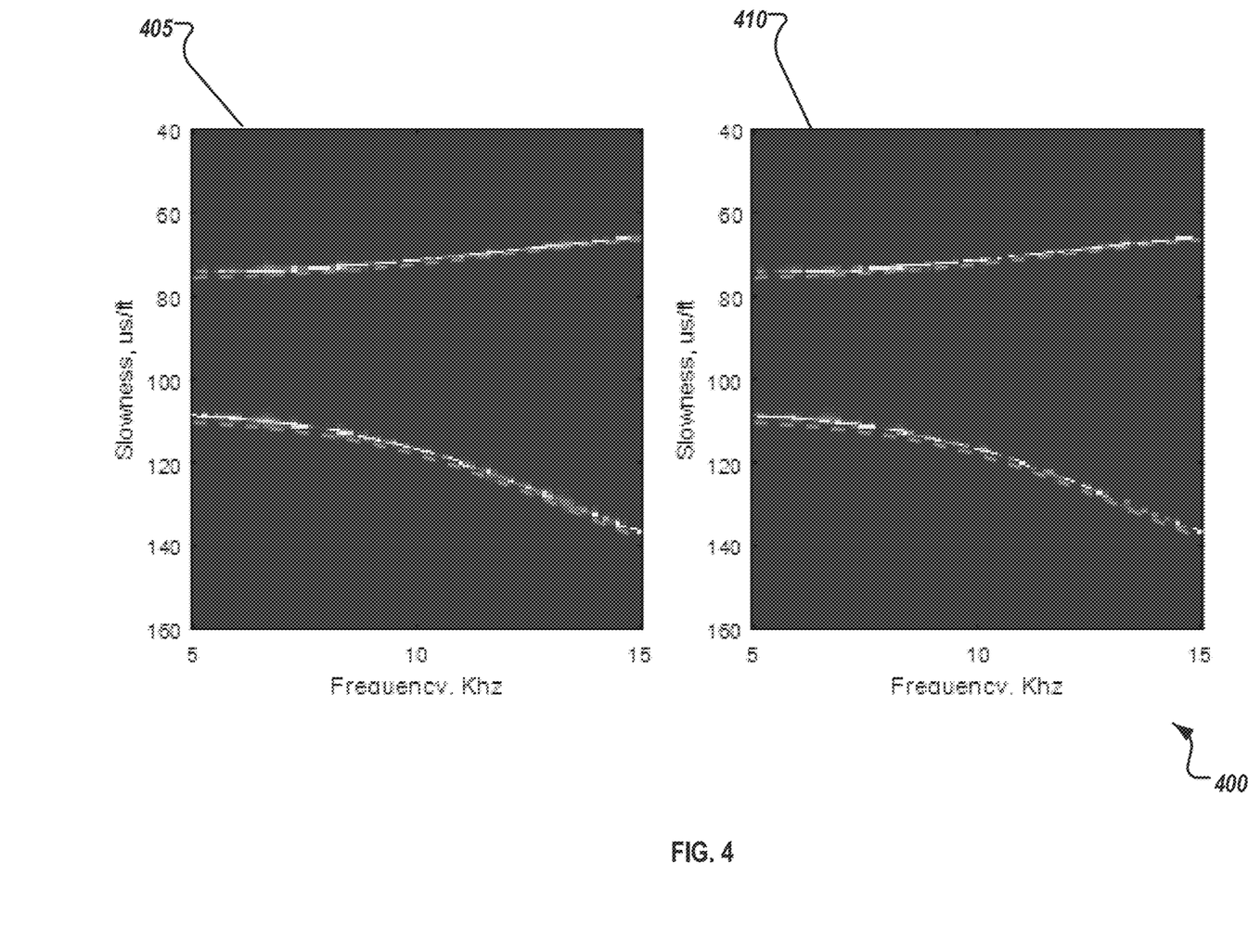
FIG. 4 illustrates example images of estimated dispersion spectra using a nonstationary MLM and a nonstationary maximum entropy method (MEM), according to some implementations.

FIG. 4 illustrates example images 400 of estimated dispersion spectra using a nonstationary MLM and a nonstationary maximum entropy method (MEM), according to some implementations. For example, the previously-described nonstationary MLM is applied to the synthetic FWS data in FIG. 2. In FIG. 4, image 405 shows estimated dispersion spectra of the nonstationary MLM, and image 410 shows estimated dispersion spectra of the nonstationary MEM of the $2^{nd}$ order (that is, i=2). As previously described, the nonstationary MLM is independent of partial LMO correction and pseudo-ensemble averaging. Therefore, the nonstationary MLM can effectively handle a nonstationary signal from a nonstationary PEF inversion perspective, and result in a focused and accurate result (that is, image 405) on dispersion characterization. As shown in FIG. 4, the nonstationary MLM, as well as the nonstationary MEM of the $2^{nd}$ order, outperform the conventional MLM in FIG. 3 in terms of accuracy and reliability. In addition, FIG. 4 illustrates that the nonstationary MLM is capable of achieving a high resolution in characterizing velocity dispersion. As a result, the estimated dispersion spectra using the nonstationary MLM is preferred and informative for inferring, for example, petrophysical properties near a borehole region.

Figure 5:
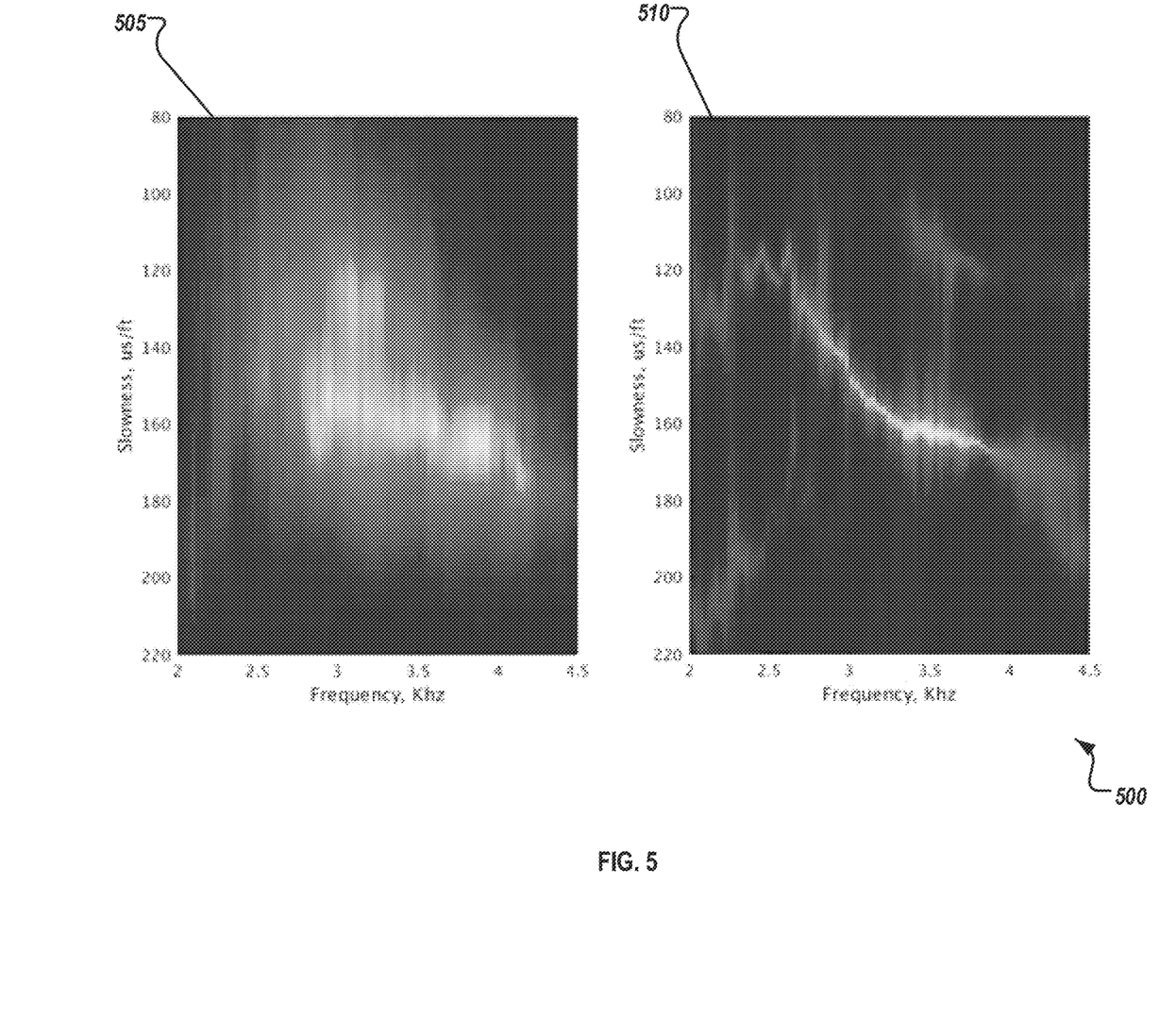
FIG. 5 illustrates example images of estimated dispersion spectra using a conventional MLM and a nonstationary MLM, according to some implementations.

FIG. 5 illustrates example images 500 of estimated dispersion spectra using a conventional MLM and a nonstationary MLM, according to some implementations. For example, the previously-described conventional MLM and nonstationary MLM are applied to a practical dipole data. The practical dipole data used in FIG. 5 is from an inline component generated by an inline dipole source (also known as XX component) over a sandstone reservoir. In FIG. 5, image 505 shows estimated dispersion spectra from the conventional MLM, and image 510 shows estimated dispersion spectra from the nonstationary MLM. As shown in FIG. 5, image 510 shows that the slowness nonlinearly increases with the increase of frequency within the range of 2000~4500 Hz for the nonstationary MLM. However, image 505 does not show a clear dispersion feature for the conventional MLM. As a result, the nonstationary MLM can generate much more reasonable and highly-resolved dispersion characterization than the conventional MLM.

Figure 6:
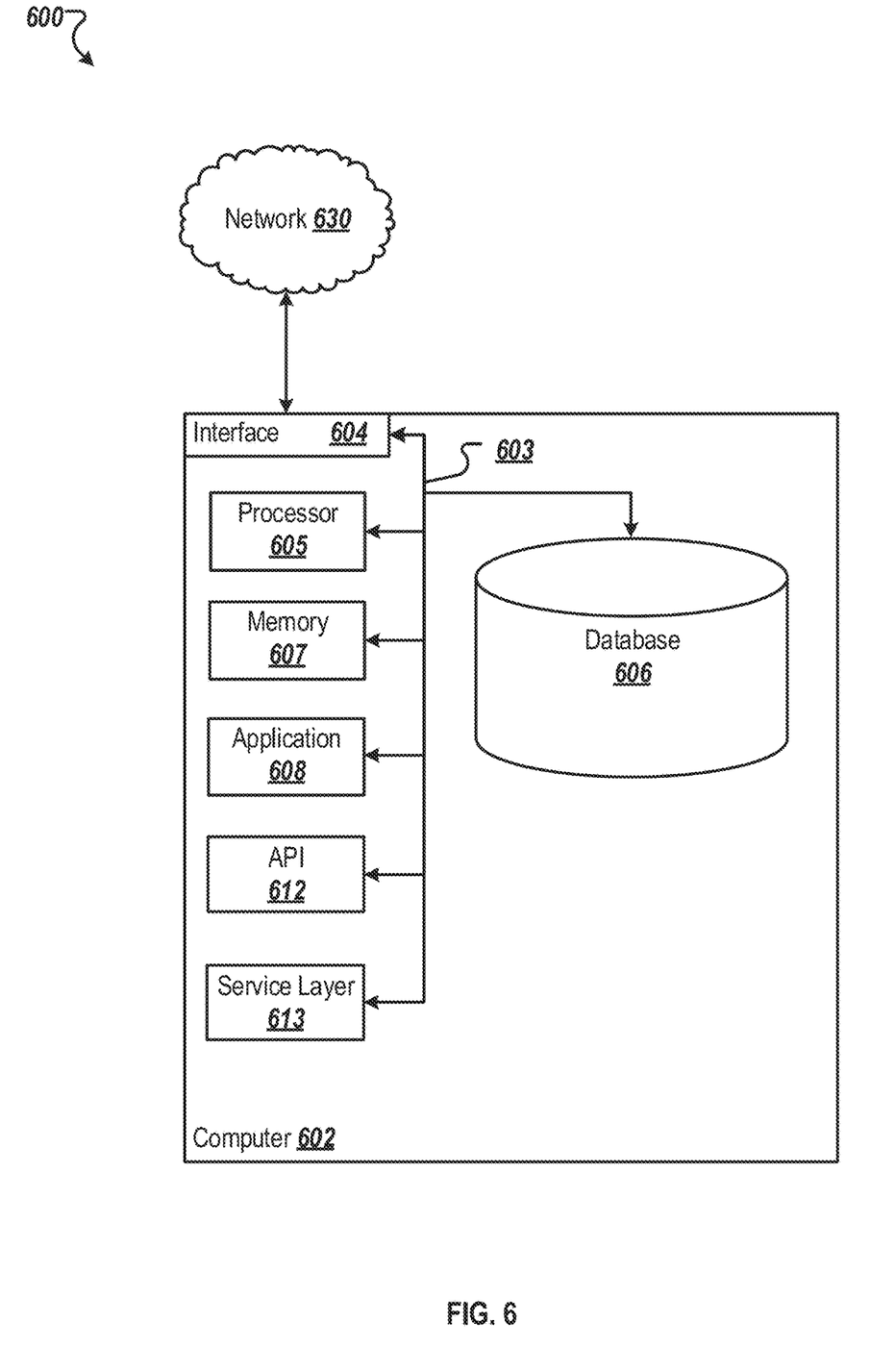
FIG. 6 is a block diagram illustrating an example computer system used to provide computational functionalities associated with described algorithms, methods, functions, processes, flows, and procedures as described in the instant disclosure, according to some implementations.

FIG. 6 is a block diagram of an example computer system 600 used to provide computational functionalities associated with described algorithms, methods, functions, processes, flows, and procedures as described in the instant disclosure, according to an implementation. The illustrated computer 602 is intended to encompass any computing device such as a server, desktop computer, laptop/notebook computer, wireless data port, smart phone, personal data assistant (PDA), tablet computing device, or one or more processors within these devices, or any other suitable processing device, including physical or virtual instances (or both) of the computing device. Additionally, the computer 602 may comprise a computer that includes an input device, such as a keypad, keyboard, or touch screen, or other device that can accept user information, and an output device that conveys information associated with the operation of the computer 602, including digital data, visual, or audio information (or a combination of information), or a graphical user interface (GUI).

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, or global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, or streaming data server, or other server (or a combination of servers).

The computer 602 can receive requests over network 630 from a client application (for example, executing on another computer) and respond to the received requests by processing the received requests using the appropriate software application(s). In addition, requests may also be sent to the computer 602 from internal users (for example, from a command console or by other appropriate access method), external or third-parties, other automated applications, as well as any other appropriate entities, individuals, systems, or computers.

Each of the components of the computer 602 can communicate using a system bus 603. In some implementations, any or all of the components of the computer 602, both hardware or software (or a combination of hardware and software), may interface with each other or the interface 604 (or a combination of both) over the system bus 603 using an application programming interface (API) 612 or a service layer 613 (or a combination of the API 612 and service layer 613). The API 612 may include specifications for routines, data structures, and object classes. The API 612 may be either computer-language independent or dependent and may refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined functionalities through a defined interface. For example, the interface may be software written in JAVA, or C++, or other suitable language providing data in extensible markup language (XML) format or other suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module, without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems that are connected to the network 630 (whether illustrated or not) in a distributed environment. Generally, the interface 604 comprises logic encoded in software or hardware (or a combination of software and hardware) and is operable to communicate with the network 630. More specifically, the interface 604 may comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure.

The computer 602 also includes a database 606 that can hold data for the computer 602 or other components (or a combination of both) that can be connected to the network 630 (whether illustrated or not). For example, database 606 can be an in-memory, conventional, or other type of database storing data consistent with this disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases (of the same or combination of types) can be used according to particular needs, desires, or particular implementations of the computer 602 and the described functionality. While database 606 is illustrated as an integral component of the computer 602, in alternative implementations, database 606 can be external to the computer 602.

The computer 602 also includes a memory 607 that can hold data for the computer 602 or other components (or a combination of both) that can be connected to the network 630 (whether illustrated or not). For example, memory 607 can be random access memory (RAM), read-only memory (ROM), optical, magnetic, and the like, storing data consistent with this disclosure. In some implementations, memory 607 can be a combination of two or more different types of memory (for example, a combination of RAM and magnetic storage) according to particular needs, desires, or particular implementations of the computer 602 and the described functionality. Although illustrated as a single memory 607 in FIG. 6, two or more memories 607 (of the same or a combination of types) can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in this disclosure. For example, application 608 can serve as one or more components, modules, or applications. Further, although illustrated as a single application 608, the application 608 may be implemented as multiple applications 608 on the computer 602. In addition, although illustrated as integral to the computer 602, in alternative implementations, the application 608 can be external to the computer 602.

There may be any number of computers 602 associated with, or external to, a computer system containing computer 602, each computer 602 communicating over network 630. Further, the term "client", "user", and other appropriate terminology may be used interchangeably, as appropriate, without departing from the scope of this disclosure. Moreover, this disclosure contemplates that many users may use one computer 602, or that one user may use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS, or any other suitable conventional operating system.

A computer program, which may also be referred to or be described as a program, software, a software application, a module, a software module, a script, or code can be written in any form of programming language, including compiled or interpreted languages, or declarative or procedural languages, and it can be deployed in any form, including as a stand-alone program or as a module, component, or subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, or methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, or a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20, or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, or data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations, and it should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A method comprising:
receiving full waveform sonic (FWS) data, wherein the FWS data are sonic waveforms recorded by a receiver array including M receivers, the sonic waveforms are excited by a transmitter and propagate along a borehole on a hydrocarbon reservoir, and M is an integer greater than 1;
performing frequency-spatial (FX) transform on the FWS data;
using a nonstationary predictive error filtering (PEF) inversion, instead of Burg algorithm, on the transformed FWS data to obtain PEF coefficients and corresponding PEF predictive errors;
estimating local matrix L and matrix P, wherein the estimated local matrix L is formed using the PEF coefficients, and the estimated local matrix P is formed using the corresponding PEF predictive errors;
calculating an inverse covariance matrix based on the estimated local matrix L and matrix P;
obtaining a nonstationary maximum likelihood method (MLM) spectra based on the inverse covariance matrix; and
obtaining petrophysical properties near the borehole on the hydrocarbon reservoir based on the nonstationary MLM spectra.

2. The method of claim 1, further comprising obtaining a nonstationary maximum entropy method (MEM) spectra based on the estimated local matrix L and matrix P.

3. The method of claim 1, wherein the inverse covariance matrix is calculated using Burg's equation.

4. The method of claim 1, wherein the nonstationary PEF inversion is performed in FX domain.

5. The method of claim 1, wherein the FX transform is one dimensional (1D) Fourier transform, and the nonstationary MLM spectra is obtained independent of linear moveout (LMO) correction.

6. A device comprising:
a memory; and
a processing unit that is arranged to perform operations including:
receiving full waveform sonic (FWS) data, wherein the FWS data are sonic waveforms recorded by a receiver array including M receivers, the sonic waveforms are excited by a transmitter and propagate along a borehole on a hydrocarbon reservoir, and M is an integer greater than 1;
performing frequency-spatial (FX) transform on the FWS data;
using a nonstationary predictive error filtering (PEF) inversion, instead of Burg algorithm, on the transformed FWS data to obtain PEF coefficients and corresponding PEF predictive errors;
estimating local matrix L and matrix P, wherein the estimated local matrix L is formed using the PEF coefficients, and the estimated local matrix P is formed using the corresponding PEF predictive errors;
calculating an inverse covariance matrix based on the estimated local matrix L and matrix P;
obtaining a nonstationary maximum likelihood method (MLM) spectra based on the inverse covariance matrix; and
obtaining petrophysical properties near the borehole on the hydrocarbon reservoir based on the nonstationary MLM spectra.

7. The device of claim 6, the operations further comprising obtaining a nonstationary maximum entropy method (MEM) spectra based on the estimated local matrix L and matrix P.

8. The device of claim 6, wherein the inverse covariance matrix is calculated using Burg's equation.

9. The device of claim 6, wherein the nonstationary PEF inversion is performed in FX domain.

10. The device of claim 6, wherein the FX transform is one dimensional (1D) Fourier transform, and the nonstationary MLM spectra is obtained independent of linear moveout (LMO) correction.

11. A non-transitory computer-readable medium storing instructions executable by a computer system to perform operations comprising:
receiving full waveform sonic (FWS) data, wherein the FWS data are sonic waveforms recorded by a receiver array including M receivers, the sonic waveforms are excited by a transmitter and propagate along a borehole on a hydrocarbon reservoir, and M is an integer greater than 1;
performing frequency-spatial (FX) transform on the FWS data;
using a nonstationary predictive error filtering (PEF) inversion, instead of Burg algorithm, on the transformed FWS data to obtain PEF coefficients and corresponding PEF predictive errors;
estimating local matrix L and matrix P, wherein the estimated local matrix L is formed using the PEF coefficients, and the estimated local matrix P is formed using the corresponding PEF predictive errors;
calculating an inverse covariance matrix based on the estimated local matrix L and matrix P;
obtaining a nonstationary maximum likelihood method (MLM) spectra based on the inverse covariance matrix; and
obtaining petrophysical properties near the borehole on the hydrocarbon reservoir based on the nonstationary MLM spectra.

12. The medium of claim 11, the operations further comprising obtaining a nonstationary maximum entropy method (MEM) spectra based on the estimated local matrix L and matrix P.

13. The medium of claim 11, wherein the inverse covariance matrix is calculated using Burg's equation.

14. The medium of claim 11, wherein the nonstationary PEF inversion is performed in FX domain.

15. The medium of claim 11, wherein the FX transform is one dimensional (1D) Fourier transform, and the nonstationary MLM spectra is obtained independent of linear moveout (LMO) correction.

* * * * *

UNITED STATES PATENT AND TRADEMARK OFFICE
CERTIFICATE OF CORRECTION

PATENT NO. : 11,353,612 B2
APPLICATION NO. : 16/298540
DATED : June 7, 2022
INVENTOR(S) : Sun et al.

Page 1 of 1

It is certified that error appears in the above-identified patent and that said Letters Patent is hereby corrected as shown below:

In the Claims

Column 15, Line 5, Claim 1, delete "method" and insert -- method, --;

Column 15, Line 41, Claim 6, delete "device" and insert -- device, --.

Signed and Sealed this
Ninth Day of August, 2022

Katherine Kelly Vidal
*Director of the United States Patent and Trademark Office*